US012559365B2

(12) United States Patent
Aljama et al.

(10) Patent No.: US 12,559,365 B2
(45) Date of Patent: Feb. 24, 2026

(54) SYSTEMS AND METHODS TO PRODUCE HYDROGEN GAS FROM HYDROGEN SULFIDE

(71) Applicant: Saudi Arabian Oil Company, Dhahran (SA)

(72) Inventors: Hassan A. Aljama, Qatif (SA); Ali A. Almofleh, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 618 days.

(21) Appl. No.: 17/973,006

(22) Filed: Oct. 25, 2022

(65) Prior Publication Data

US 2024/0132344 A1 Apr. 25, 2024
US 2024/0228270 A9 Jul. 11, 2024

(51) Int. Cl.
*C01B 3/04* (2006.01)
*C01B 3/508* (2026.01)

(52) U.S. Cl.
CPC ............... *C01B 3/04* (2013.01); *C01B 3/508* (2013.01); *C01B 2203/0277* (2013.01); *C01B 2203/0425* (2013.01); *C01B 2203/043* (2013.01); *C01B 2203/0485* (2013.01); *C01B 2203/1011* (2013.01); *C01B 2203/169* (2013.01)

(58) Field of Classification Search
CPC ..... B01J 8/0278; B01J 2208/021; C01B 3/04; C01B 3/508; C01B 2203/0277; C01B 2203/0425; C01B 2203/043; C01B 2203/0485; C01B 2203/063; C01B 2203/1011; C01B 2203/169
See application file for complete search history.

(56) References Cited

U.S. PATENT DOCUMENTS

| | | | |
|---|---|---|---|
| 2,979,384 | A | 4/1961 | Weiner et al. |
| 4,039,613 | A | 8/1977 | Kotera et al. |
| 5,397,556 | A | 3/1995 | Towler et al. |
| 5,843,395 | A | 12/1998 | Wang |
| 6,403,051 | B1 | 6/2002 | Keller |
| 7,637,984 | B2 | 12/2009 | Adamopoulos |
| 8,206,669 | B2 | 6/2012 | Schaffer et al. |
| 8,518,356 | B2 | 8/2013 | Schaffer et al. |

(Continued)

FOREIGN PATENT DOCUMENTS

| | | |
|---|---|---|
| CA | 2835148 | 11/2012 |
| CN | 100450917 | 1/2009 |

(Continued)

OTHER PUBLICATIONS

De Crisci et al., "Hydrogen from hydrogen sulfide: towards a more sustainable hydrogen economy," International Journal of Hydrogen Energy, 2019, 44(3):1299-1327, 29 pages.

(Continued)

*Primary Examiner* — Lessanework Seifu

(74) *Attorney, Agent, or Firm* — Fish & Richardson P.C.

(57) ABSTRACT

The disclosure relates to systems and methods to produce hydrogen ($H_2$) gas from hydrogen sulfide ($H_2S$). $H_2S$ is contacted with a catalyst to form $H_2$ gas and sulfur adsorbed to the catalyst. The adsorbed sulfur is contacted with oxygen ($O_2$) gas to convert the adsorbed sulfur to sulfur dioxide ($SO_2$) and regenerate the catalyst.

20 Claims, 8 Drawing Sheets

(56) References Cited

U.S. PATENT DOCUMENTS

| | | | |
|---|---|---|---|
| 9,255,005 | B2 | 2/2016 | Angelini et al. |
| 2021/0245095 | A1* | 8/2021 | Fan ........................ B01D 53/52 |
| 2024/0327208 | A1 | 10/2024 | Aljama et al. |

FOREIGN PATENT DOCUMENTS

| | | |
|---|---|---|
| FR | 2982254 | 5/2013 |
| WO | WO 2008137936 | 11/2008 |
| WO | WO 2011064468 | 6/2011 |

OTHER PUBLICATIONS

Kwok et al., "Constrained Growth of MoS2 Nanosheets within a Mesoporous Silica Shell and Its Effects on Defect Sites and Catalyst Stability for H2S Decomposition," ACS Catalysis, 2018, 8(1):714-724, 13 pages.

Alexeeva, "Hydrogen production from thermocatalytic hydrogen sulfide decomposition," Hydrogen Materials Science and Chemistry of Metal Hydrides, NATO Science Series, 71: 49-59, 9 pages.

Crevier et al., "Saudi Aramco Eliminates Claus Catalyst Deactivation Caused by Aromatics Using Activated Carbon," IPTC, IPTC 11432, International Petroleum Technology Conference held in Dubai, U.A.E., Dec. 4-6, 2007, 14 pages.

Ipsakis et al., "An electrocatalytic membrane-assisted process for hydrogen production from H2S in Black Sea: Preliminary results" International Journal of Hydrogen Energy, Jun. 2015, 40(24):7530-7538, 9 pages.

Kaloidas et al., "Kinetic studies on the catalytic decomposition of hydrogen sulfide in a tubular reactor," Industrial & engineering chemistry research, 1991, 30(2):345-351, 7 pages.

* cited by examiner $$S\text{-}catalyst + O_2 \longrightarrow SO_2 + catalyst$$

Figure 2

$$4 \, H_2S + 2 \, SO_2 \longrightarrow 4 \, H_2O + 3 \, S_2$$

Figure 6

SYSTEMS AND METHODS TO PRODUCE HYDROGEN GAS FROM HYDROGEN SULFIDE

FIELD

The disclosure relates to systems and methods to produce hydrogen ($H_2$) gas from hydrogen sulfide ($H_2S$). $H_2S$ is contacted with a catalyst to form $H_2$ gas and sulfur adsorbed to the catalyst. The adsorbed sulfur is contacted with oxygen ($O_2$) gas to convert the adsorbed sulfur to sulfur dioxide ($SO_2$) and regenerate the catalyst.

BACKGROUND $H_2S$ is treated in sulfur recovery units (SRU) (e.g., by the Claus process) of oil and gas processing facilities. In the SRU, $H_2S$ is partially converted to $SO_2$, followed by two or more catalytic steps where $SO_2$ reacts with $H_2S$ to create sulfur and water.

SUMMARY

The disclosure relates to systems and methods to produce $H_2$ gas from $H_2S$. $H_2S$ is contacted with a catalyst to form $H_2$ gas and sulfur adsorbed to the catalyst. The adsorbed sulfur is contacted with $O_2$ gas to convert the adsorbed sulfur to $SO_2$ and regenerate the catalyst.

The systems and methods generate $H_2$, which can be used for a variety of purposes (e.g., energy production, oil upgrading), along with water and sulfur, whereas certain other known methods involving a SRU instead only generate water and sulfur. The systems and methods can produce $H_2$ from $H_2S$ relatively efficiently compared to certain other known methods of generating $H_2$ from $H_2S$. Furthermore, the $SO_2$ produced can be directly introduced into an appropriate component of the SRU for further treatment relatively easily.

The systems and methods reduce (e.g., prevent) catalyst deactivation and loss of performance due to sulfur build-up relative to certain other known catalytic methods of $H_2S$ dissociation. Generally, in the systems and methods of the disclosure, the catalyst is continuously regenerated, and the adsorbed sulfur is removed. Due to the exothermic nature of $SO_2$ production, the systems and methods can have a reduced heat requirement relative to certain known single step processes. The systems and methods can be implemented by retrofitting existing infrastructure, thereby allowing pre-existing systems and methods to be applied relatively easily.

In a first aspect, the disclosure provides a method, including: a) contacting hydrogen sulfide with a catalyst to form hydrogen gas and sulfur adsorbed to the catalyst; and b) contacting the adsorbed sulfur with oxygen to convert the adsorbed sulfur to sulfur dioxide, thereby regenerating the catalyst.

In some embodiments, the method further includes using a first reactor including the catalyst to perform a), and using a second reactor including the catalyst to perform b), wherein the first reactor is different from the second reactor.

In some embodiments, the method includes simultaneously performing a) and b).

In some embodiments, the method further includes: in a first state, performing a) in a first reactor and performing b) in the second reactor; in a second state, performing a) in the second reactor and performing b) in the first reactor; and switching between the first and second states.

In some embodiments, the method is performed in the first state until a predetermined amount of sulfur is adsorbed to the catalyst in the first reactor.

In some embodiments, after the predetermined amount of sulfur is adsorbed to the catalyst in the first reactor, the method is switched to the second state.

In some embodiments, the same hydrogen sulfide source is used to supply hydrogen sulfide to the first reactor in the first state and to supply hydrogen sulfide to the second reactor in the second state, and the same oxygen source is used to supply oxygen to the second reactor in the first state and to oxygen sulfide to the first reactor in the second state.

In some embodiments, b) produces sulfur dioxide, and the method further includes sending the sulfur dioxide to a component of a sulfur recovery unit.

In some embodiments, the component of the sulfur recovery unit includes a reaction furnace and/or an inlet to a catalytic converter.

In some embodiments, the catalyst includes a metal sulfide, an alloy, a metal oxide, and/or a pure metal.

In some embodiments, the catalyst includes molybdenum sulfide, iron sulfide, a silver-bismuth alloy, vanadium oxide, iron oxide and/or molybdenum.

In some embodiments, hydrogen sulfide is produced from a hydrocarbon producing well.

In a second aspect, the disclosure provides a system, including a first reactor, a second reactor, a hydrogen sulfide source and an oxygen source. The first reactor includes a first catalyst configured to catalyze the conversion of hydrogen sulfide to hydrogen gas and sulfur, a first gas inlet including a valve, and a second gas inlet including a valve. The second reactor includes a second catalyst configured to catalyze the conversion of hydrogen sulfide to hydrogen gas and sulfur, a first gas inlet including a valve, and a second gas inlet including a valve. In a first configuration of the system: the valve of the first gas inlet of the first reactor is open so that the hydrogen sulfide source is in fluid communication with an interior of the first reactor; the valve of the second gas inlet of the first reactor is closed so that the oxygen gas source is in not fluid communication with an interior of the first reactor; the valve of the first gas inlet of the second reactor is closed so that the hydrogen sulfide source is not in fluid communication with an interior of the second reactor; and the valve of the second gas inlet of the second reactor is open so that the oxygen gas source is in fluid communication with an interior of the second reactor. In a second configuration of the system: the valve of the first gas inlet of the first reactor is closed so that the hydrogen sulfide source is not in fluid communication with an interior of the first reactor; the valve of the second gas inlet of the first reactor is open so that the oxygen gas source is in fluid communication with an interior of the first reactor; the valve of the first gas inlet of the second reactor is open so that the hydrogen sulfide source is in fluid communication with an interior of the second reactor; and the valve of the second gas inlet of the second reactor is closed so that the oxygen gas source is not in fluid communication with an interior of the second reactor.

In certain embodiments, the system further includes a controller configured to control the configuration of the system.

In certain embodiments, the controller is configured to switch the system from the first configuration to the second configuration based on an amount of sulfur adsorbed to the first catalyst.

In certain embodiments, the controller is configured to switch the system from the second configuration to the first configuration based on an amount of sulfur adsorbed to the second catalyst.

In certain embodiments, the first reactor further includes a gas outlet including a valve, the second reactor further includes a gas outlet including a valve, and the system further includes a sulfur recovery unit (SRU). In the first configuration, the valve of the gas outlet of the first reactor is closed so that the interior of the first reactor is not in fluid communication with the SRU, and the valve of the gas outlet of the second reactor is open so that the interior of the second reactor is in fluid communication with the SRU. In the second configuration, the valve of the gas outlet of the first reactor is open so that the interior of the first reactor is in fluid communication with the SRU and the valve of the gas outlet of the second reactor is closed so that the interior of the second reactor is not in fluid communication with the SRU.

In certain embodiments, the first catalyst and the second catalyst include a metal sulfide, an alloy, a metal oxide, and/or a pure metal.

In certain embodiments, the first catalyst and the second catalyst include molybdenum sulfide, iron sulfide, a silver-bismuth alloy, vanadium oxide, iron oxide and/or molybdenum.

In certain embodiments, the hydrogen sulfide source includes a gas stream produced from treating a hydrocarbon stream produced from a hydrocarbon producing well.

BRIEF DESCRIPTION OF THE FIGURES

FIG. 2 is a scheme for a chemical reaction.
FIG. 6 is a scheme for a chemical reaction.

DETAILED DESCRIPTION

Figure 1:
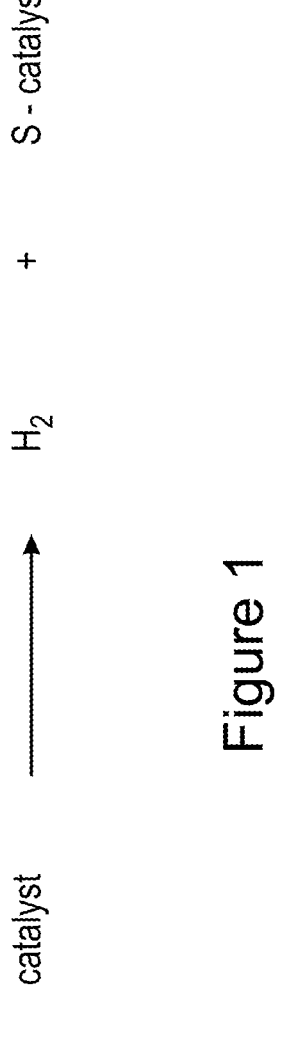
FIG. 1 is a scheme for a chemical reaction.
Figure 2:
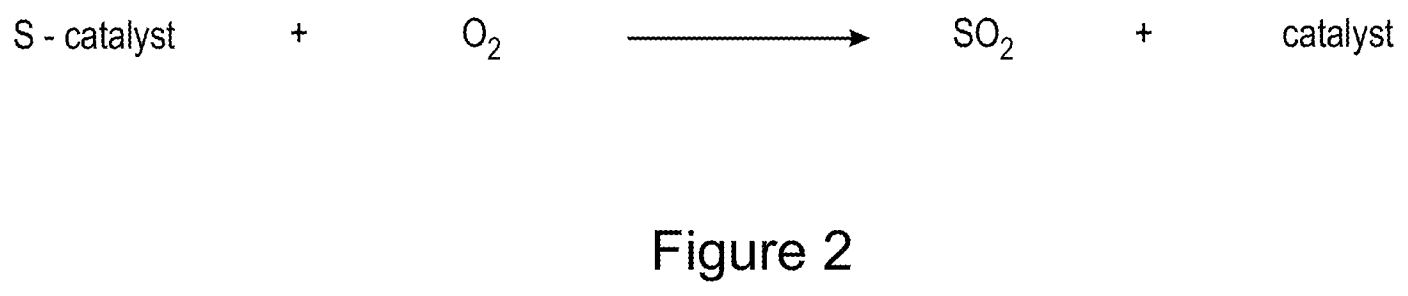

FIGS. 1 and 2 schematically depict general reaction schemes according to the disclosure. In FIG. 1, $H_2S$ gas is contacted with a catalyst and dissociated to form $H_2$ gas and sulfur adsorbed on the catalyst (S-catalyst). In FIG. 2, $O_2$ gas is contacted with the sulfur adsorbed on the catalyst to form $SO_2$ gas and regenerate the catalyst.

In general, any appropriate catalyst can be used. Examples of such catalysts include metal sulfides (e.g. molybdenum sulfide, iron sulfide), alloys (e.g. silver-bismuth), metal oxides (e.g. vanadium oxide, iron oxide), and pure metals (e.g., molybdenum).

The reaction depicted in FIG. 1 is performed at a temperature and a pressure appropriate for the catalyst to decompose Hz. In some embodiments, the reaction depicted in FIG. 1 is performed at a temperature of at least 300 (e.g., at least 400, at least 500, at least 600, at least 700, at least 800, at least 900) ° C. and/or at most 1000 (e.g., at most 900, at most 800, at most 700, at most 600, at most 500, at most 400) ° C. In some embodiments, the reaction depicted in FIG. 1 is performed at a pressure of at least 1 (e.g., at least 2, at least 3, at least 4, at least 5, at least 6, at least 8, at least 10, at least 12, at least 14, at least 16, at least 18) atmospheres (atm) and/or at most 20 (e.g., at most 18, at most 16, at most 14, at most 12, at most 10, at most 8, at most 6, at most 5, at most 4, at most 3, at most 2) atm.

The reaction depicted in FIG. 1 is performed at a temperature and a pressure appropriate to remove the adsorbed sulfur from the catalyst. In certain embodiments, the reaction depicted in FIG. 2 is performed at a temperature of at least 300 (e.g., at least 400, at least 500, at least 600, at least 700, at least 800, at least 900) ° C. and/or at most 1000 (e.g., at most 900, at most 800, at most 700, at most 600, at most 500, at most 400) ° C. In certain embodiments, the reaction depicted in FIG. 2 is performed at a pressure of at least 1 (e.g., at least 2, at least 3, at least 4, at least 5, at least 6, at least 8, at least 10, at least 12, at least 14, at least 16, at least 18) atmospheres (atm) and/or at most 20 (e.g., at most 18, at most 16, at most 14, at most 12, at most 10, at most 8, at most 6, at most 5, at most 4, at most 3, at most 2) atm.

Figure 3:
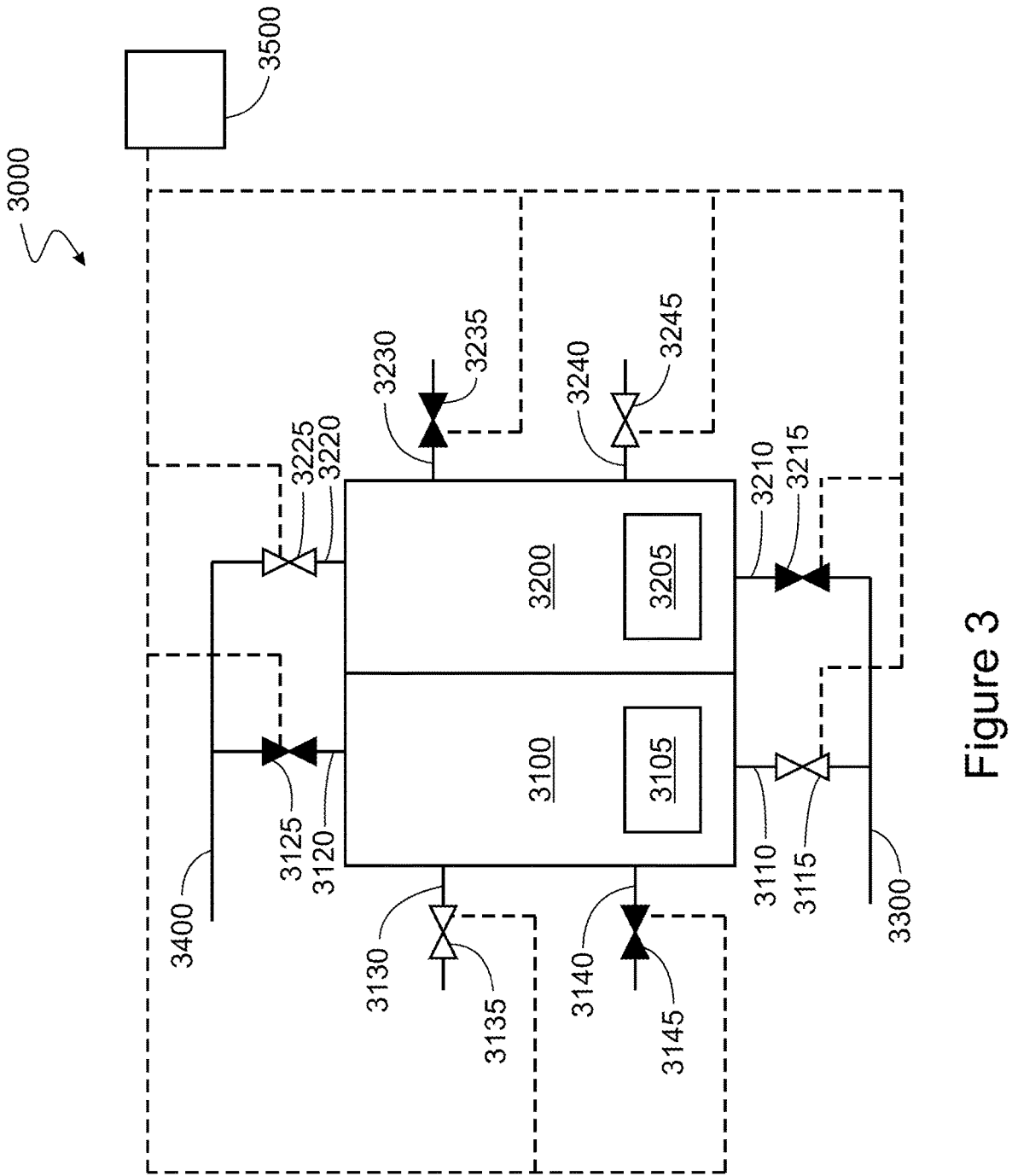
FIG. 3 schematically depicts a system.

FIG. 3 depicts a system 3000 that includes a reactor 3100, a reactor 3200, an acid gas stream 3300 containing $H_2S$, an $O_2$ gas source 3400, and a controller 3500.

The reactor 3100 contains a catalyst 3105, an inlet 3110 including a valve 3115, and an inlet 3120 including a valve 3125. The reactor 3100 also includes an outlet 3130 including a valve 3135 and an outlet 3140 including a valve 3145. When the valve 3115 is open, $H_2S$ flows from the acid gas stream 3300 into the reactor 3100 via the valve 3115 and the inlet 3110. When the valve 3115 is closed, the acid gas stream 3300 is not in fluid communication with the reactor 3100. When the valve 3125 is open, $O_2$ flows from the $O_2$ gas source 3400 into the reactor 3100 via the valve 3125 and the inlet 3120. When the valve 3125 is closed, the $O_2$ gas source 3400 is not in fluid communication with reactor 3100.

When the valve 3115 is open, the valves 3125 and 3145 are closed, and the valve 3135 is open. In this configuration, the reaction shown in FIG. 1 occurs in the reactor 3100, and the $H_2$ produced by the reaction leaves the reactor 3100 via the outlet 3130.

When the valve 3125 is open, the valves 3115 and 3135 are closed, and the valve 3145 is open. In this configuration, the reaction shown in FIG. 2 occurs in the reactor 3100, and the $SO_2$ produced by the reaction leaves the reactor 3100 via the outlet 3140.

The reactor 3200 has a similar arrangement to the reactor 3100, and the reactor 3200 operates in a similar way to the reactor 3100. The components of the reactor 3200 correspond to the components of the reactor 3100, except that the reference numbers start with "32" rather than "31."

In general, the various valves of the system 3000 are configured so that, while the reactor 3100 performs the reaction depicted in FIG. 1, the reactor 3200 performs the reaction depicted in FIG. 2, and vice-versa.

As an example, when the reactor 3100 performs the reaction in FIG. 1, the reactor 3200 performs the reaction in FIG. 2. In this case, the white valves in FIG. 3 (the valves 3115, 3135, 3225 and 3245) are open, and the black valves in FIG. 3 (the valves 3125, 3145, 3215, and 3235) are closed. The valve 3115 is open and the valve 3125 is closed, allowing the acid gas stream 3300 containing $H_2S$ to enter the reactor 3100 via the inlet 3110 but not the reactor 3200. The $H_2S$ reacts with the catalyst 3105 in the reactor 3100 to form $H_2$ and sulfur adsorbed on the catalyst 3105 (as depicted in FIG. 1). The valve 3135 is open to remove $H_2$ from the reactor 3100 via the outlet 3130 while the valve 3145 is closed. The valve 3125 is closed, and the valve 3225 is open, allowing the $O_2$ gas source 3400 to enter the reactor 3200 via the inlet 3220 but not the reactor 3100. The $O_2$ reacts with the sulfur adsorbed on the catalyst 3205 to generate $SO_2$ and regenerate the catalyst 3205 (as depicted in FIG. 2). The valve 3235 is closed while the valve 3245 is open, allowing the $SO_2$ to exit the reactor 3200 via the outlet 3240.

As another example, when the reactor 3200 performs the reaction in FIG. 1, the reactor 3100 performs the reaction in FIG. 2. In this case, the white valves in FIG. 3 (the valves 3115, 3135, 3225 and 3245) are closed and the black valves in FIG. 3 (the valves 3125, 3145, 3215, and 3235) are open. The valve 3215 is open and the valve 3115 is closed, allowing acid gas stream 3300 containing $H_2S$ to enter the reactor 3200 via the inlet 3210 but not the reactor 3100. The $H_2S$ reacts with the catalyst 3205 in the reactor 3200 to form $H_2$ and sulfur adsorbed on the catalyst 3205 (as depicted in FIG. 1). The valve 3235 is open to remove $H_2$ from the reactor 3200 via the outlet 3230 while the valve 3245 is closed. The valve 3225 is closed while valve 3125 is open, allowing the $O_2$ gas source 3400 to enter the reactor 3100 via the inlet 3120 but not the reactor 3200. The $O_2$ reacts with the sulfur adsorbed on the catalyst 3105 to generate $SO_2$ and regenerate the catalyst 3105 (as depicted in FIG. 2). The valve 3135 is closed while the valve 3145 is open, allowing the $SO_2$ to exit the reactor 3100 via the outlet 3140.

The $H_2$ generated in the system 3000 and via the outlet 3130 or 3230 can used for one or more of a variety of purposes (e.g., energy production, oil upgrading).

Typically, the reaction depicted in FIG. 1 is performed until the surface of the catalyst 3105 or 3205 is saturated with adsorbed sulfur. In general, the amount of sulfur adsorbed depends on the amount of catalyst 3105 or 3205 used and the capacity of the catalyst 3105 or 3205. In some embodiments, the amount of sulfur adsorbed can be calculated based on the amount of catalyst used and/or the capacity of the catalyst. In some embodiments, the reaction depicted in FIG. 1 is performed until a predetermined amount of sulfur is adsorbed to the catalyst 3105 or 3205 (e.g., at least 75, at least 80, at least 85, at least 90, at least 95, at least 98, at least 99, at least 99.5% of the surface of the catalyst 3105 or 3205 contains adsorbed sulfur). Then the state of each of the relevant valves is changed to switch the process to the reaction depicted in FIG. 2 so that the adsorbed sulfur is removed from the catalyst 3105 or 3205. Typically, the reaction depicted in FIG. 2 is performed until most (e.g., all) of the sulfur adsorbed on the catalyst 3105 or 3205 is removed. In general, switching between reactions can be performed as many times as desired.

As shown in FIG. 3, the controller 3500 is in signal communication with each of the valves 3115, 3125, 3135, 3145, 3215, 3225, 3235, and/or 3245. The controller 3500 controls the state (open or closed) of each of the valves 3115, 3125, 3135, 3145, 3215, 3225, 3235, and/or 3245 as appropriate. The controller 3500 may be used to provide more robust process control and higher efficiency.

In some embodiments, the controller 3500 may be a separate unit mounted in a desired location (e.g., the plant), such as a programmable logic controller (PLC), for example, as part of a supervisory control and data acquisition (SCADA) or Fieldbus network. In certain embodiments, the controller 3500 may interface to a distributed control system (DCS) installed in a control center (e.g., a central control center). In some embodiments, the controller 3500 may be a virtual controller running on a processor in a DCS, on a virtual processor in a cloud server, or using other real or virtual processors.

In some embodiments, the controller 3500 includes a processor. The processor may be any appropriate processor, such as, for example, a microprocessor, a multi-core processor, a multithreaded processor, an ultra-low-voltage processor, an embedded processor, or a virtual processor. The processor may be part of a system-on-a-chip (SoC) in which the processor and other components are formed into a single integrated package. In various embodiments, the processor may include processors from, for example, Intel® Corporation of Santa Clara, California, from Advanced Micro Devices, Inc. (AMD) of Sunnyvale, California, or from ARM holdings, LTD., of Cambridge England. Any number of other processors from other suppliers may also be used.

In some embodiments, the processor may communicate with other components of the controller 3500 over a bus. The bus may include any number of technologies, such as industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus technologies may be used, in addition to, or instead of, the technologies above. For example, plant interface systems may include I2C buses, serial peripheral interface (SPI) buses, Fieldbus, and the like.

In some embodiments, the bus may couple the processor to a memory. In some embodiments, such as in PLCs and other process control units, the memory is integrated with a data store used for long-term storage of programs and data. The memory includes any number of volatile and nonvolatile memory devices, such as volatile random-access memory (RAM), static random-access memory (SRAM), flash memory, and the like. In smaller devices, such as PLCs, the memory may include registers associated with the processor itself. The data store is used for the persistent storage of information, such as data, applications, operating systems, and so forth. The data store may be a nonvolatile RAM, a solid-state disk drive, or a flash drive, among others. In some embodiments, the data store will include a hard disk drive, such as a micro hard disk drive, a regular hard disk drive, or an array of hard disk drives, for example, associated with a DCS or a cloud server.

In some embodiments, the bus couples the controller 3500 to a controller interface. The controller interface may be an interface to a plant bus, such as a Fieldbus, an I2C bus, an SPI bus, and the like. In some embodiments, the controller interface couples the controller 3500 to a sensor to measure an amount of adsorbed sulfur on the catalyst 3105 and/or the catalyst 3205.

In some embodiments, a local human machine interface (HMI) may be used to input control parameters. The local HMI may be coupled to a user interface, including, for example, a display that includes a multiline LCD display, or a display screen, among others. The user interface may also include a keypad for the entry of control parameters, such as the starting parameters for the flow of the lean solvent into the contactor. Generally, the controller 3500 will either be part of a plant control system, such as a DCS, or coupled through a plant bus system to the plant control system.

In some embodiments, the controller 3500 is linked to a control system for the system 3000 through a network interface controller (NIC). The NIC can be an Ethernet interface, a wireless network interface, or a plant bus interface, such as Fieldbus.

In some embodiments, the data store includes blocks of stored instructions that, when executed, direct the processor to implement the control functions for the system 3000. The data store includes a block of instructions to direct the processor measure an amount of adsorbed sulfur on the catalyst 3105 and/or the catalyst 3205 and/or open and close the valves 3115, 3125, 3135, 3145, 3215, 3225, 3235, and/or 3245 as appropriate.

In certain embodiments, the acid gas stream 3300 is an acid gas stream produced by treating a natural gas stream. As an example, the acid gas stream 3300 can be formed by treating a natural gas stream with an amine unit to separate $H_2S$ and carbon dioxide ($CO_2$) from methane and other hydrocarbons, with the $H_2S$ and $CO_2$ forming the acid gas stream 3300. The natural gas stream can be produced, for example, from a hydrocarbon producing well. In certain embodiments, the acid gas stream 3300 undergoes pretreatment prior to introduction into the reactor 3100 or the reactor 3200 to reduce (e.g., prevent) poisoning of the surface of the catalyst 3105 and/or 3205. Pretreatment can include removing an impurity (e.g., benzene, toluene, xylene, ammonia) through a pretreatment step (e.g., adsorption, absorption, membrane filtering).

In some embodiments, the acid gas stream 3300 contains at least 20 (e.g., at least 30, at least 40, at least 50, at least 60, at least 70, at least 80) mole percent (mol. %) and/or at most 90 (e.g., at most 80, at most 70, at most 60, at most 50, at most 40, at most 30) mol. % $H_2S$. In some embodiments, the acid gas stream contains at least 20 (e.g., at least 30, at least 40, at least 50, at least 60) mol. % and/or at most 70 (e.g., at most 60, at most 50, at most 40, at most 30) mol. % $CO_2$. In some embodiments, the acid gas stream 3300 contains at least 1 (e.g., at least 2, at least 3, at least 4, at least 5, at least 6, at least 7, at least 8, at least 9) mol. % and/or at most 10 (e.g., at most 9, at most 8, at most 7, at most 6, at most 5, at most 4, at most 3, at most 2) mol. % water ($H_2O$). In some embodiments, the acid gas stream 3300 contains at least 0.1 (e.g., at least 0.2, at least 0.5, at least 1, at least 2, at least 3, at least 4, at least 5, at least 6, at least 7, at least 8, at least 9) mol. % and/or at most 10 (e.g., at most 9, at most 8, at most 7, at most 6, at most 5, at most 4, at most 3, at most 2, at most 1, at most 0.5) mol. % ammonia ($NH_3$). In some embodiments, the acid gas stream 3300 contains at least 0.1 (e.g., at least 0.2, at least 0.5, at least 1, at least 2, at least 3, at least 4) mol. % and/or at most 5 (e.g., at most 4, at most 3, at most 2, at most 1, at most 0.5) mol. % methane ($CH_4$). In some embodiments, the acid gas stream 3300 contains at least 0.1 (e.g., at least 0.2, at least 0.5, at least 1, at least 2, at least 3, at least 4) mol. % and/or at most 5 (e.g., at most 4, at most 3, at most 2, at most 1, at most 0.5) mol. % carbon disulfide ($CS_2$). In some embodiments, the acid gas stream 3300 contains at least 0.1 (e.g., at least 0.2, at least 0.5, at least 1, at least 2, at least 3, at least 4) mol. % and/or at most 5 (e.g., at most 4, at most 3, at most 2, at most 1, at most 0.5) mol. % carbonyl sulfide (OCS). In some embodiments, the acid gas stream 3300 contains at least 0.1 (e.g., at least 0.2, at least 0.5, at least 1, at least 2, at least 3, at least 4) mol. % and/or at most 5 (e.g., at most 4, at most 3, at most 2, at most 1, at most 0.5) mol. % benzene, toluene and/or xylene.

In certain embodiments, the $H_2$-containing stream (removed from the outlet 3130 of the reactor 3100 or the outlet 3230 of the reactor 3200) contains at least 20 (e.g., at least 30, at least 40, at least 50, at least 60, at least 70, at least 80) mol. % and/or at most 90 (e.g., at most 80, at most 70, at most 60, at most 50, at most 40, at most 30) mol. % $H_2$. In certain embodiments, the $H_2$-containing stream contains at least 20 (e.g., at least 30, at least 40, at least 50, at least 60) mol. % and/or at most 70 (e.g., at most 60, at most 50, at most 40, at most 30) mol. % $CO_2$. In certain embodiments, the $H_2$-containing stream contains at least 1 (e.g., at least 2, at least 3, at least 4, at least 5, at least 6, at least 7, at least 8, at least 9) mol. % and/or at most 10 (e.g., at most 9, at most 8, at most 7, at most 6, at most 5, at most 4, at most 3, at most 2) mol. % $H_2O$. In certain embodiments, the $H_2$-containing stream contains at least 0.1 (e.g., at least 0.2, at least 0.5, at least 1, at least 2, at least 3, at least 4, at least 5, at least 6, at least 7, at least 8, at least 9) mol. % and/or at most 10 (e.g., at most 9, at most 8, at most 7, at most 6, at most 5, at most 4, at most 3, at most 2, at most 1, at most 0.5) mol. % $NH_3$. In certain embodiments, the Hz-containing stream contains at least 0.1 (e.g., at least 0.2, at least 0.5, at least 1, at least 2, at least 3, at least 4) mol. % and/or at most 5 (e.g., at most 4, at most 3, at most 2, at most 1, at most 0.5) mol. % $CH_4$. In certain embodiments, the Hz-containing stream contains at least 0.1 (e.g., at least 0.2, at least 0.5, at least 1, at least 2, at least 3, at least 4) mol. % and/or at most 5 (e.g., at most 4, at most 3, at most 2, at most 1, at most 0.5) mol. % $CS_2$. In certain embodiments, the Hz-containing stream contains at least 0.1 (e.g., at least 0.2, at least 0.5, at least 1, at least 2, at least 3, at least 4) mol. % and/or at most 5 (e.g., at most 4, at most 3, at most 2, at most 1, at most 0.5) mol. % OCS. In certain embodiments, the Hz-containing stream contains at least 0.1 (e.g., at least 0.2, at least 0.5, at least 1, at least 2, at least 3, at least 4) mol. % and/or at most 5 (e.g., at most 4, at most 3, at most 2, at most 1, at most 0.5) mol. % benzene, toluene and/or xylene.

Examples of the $O_2$ gas source 3400 include air and pure $O_2$. In some embodiments, the $O_2$ gas source 3400 contains at least 20 (e.g., at least 21, at least 30, at least 40, at least 50, at least 60, at least 70, at least 80, at least 90, at least 95, at least 97, at least 98, at least 99, at least 99.5, at least 99.9) mol. % $O_2$ and/or at most 100 (e.g., at most 99.9, at most 99.5, at most 99, at most 98, at most 97, at most 95, at most 90, at most 80, at most 70, at most 60, at most 50, at most 40, at most 30) mol. % $O_2$.

In certain embodiments, the $SO_2$-containing stream (removed from the outlet 3140 of the reactor 3100 or the outlet 3240 of the reactor 3200) contains at least 20 (e.g., at least 30, at least 40, at least 50, at least 60, at least 70, at least 80) mol. % and/or at most 90 (e.g., at most 80, at most 70, at most 60, at most 50, at most 40, at most 30) mol. % $SO_2$. In certain embodiments, the $SO_2$-containing stream contains at least 20 (e.g., at least 30, at least 40, at least 50, at least 60) mol. % and/or at most 70 (e.g., at most 60, at most 50, at most 40, at most 30) mol. % $CO_2$. In certain embodiments, the $SO_2$-containing stream contains at least 0.1 (e.g., at least 0.2, at least 0.5, at least 1, at least 2, at least 3, at least 4, at least 5, at least 6, at least 7, at least 8, at least 9, at least 10, at least 15) mol. % and/or at most 20 (e.g., at most 15, at most 10, at most 9, at most 8, at most 7, at most 6, at most 5, at most 4, at most 3, at most 2, at most 1, at most 0.5) mol. % $H_2O$. In certain embodiments, the 502-containing stream contains at least 0.1 (e.g., at least 0.2, at least 0.5, at least 1, at least 2, at least 3, at least 4) mol. % and/or at most 5 (e.g., at most 4, at most 3, at most 2, at most 1, at most 0.5) mol. % nitrous oxide ($NO_2$).

Typically, the outlet 3140 is in fluid communication with a component of a SRU (e.g., a reaction furnace, an inlet to a converter) when the valve 3145 is open, and the outlet 3240 is in fluid communication with a component of a SRU (e.g., a reaction furnace, an inlet to a converter) when the valve 3245 is open. This can allow the $SO_2$ formed in the system 3000 to be directly introduced into the SRU for further treatment.

Figure 4:
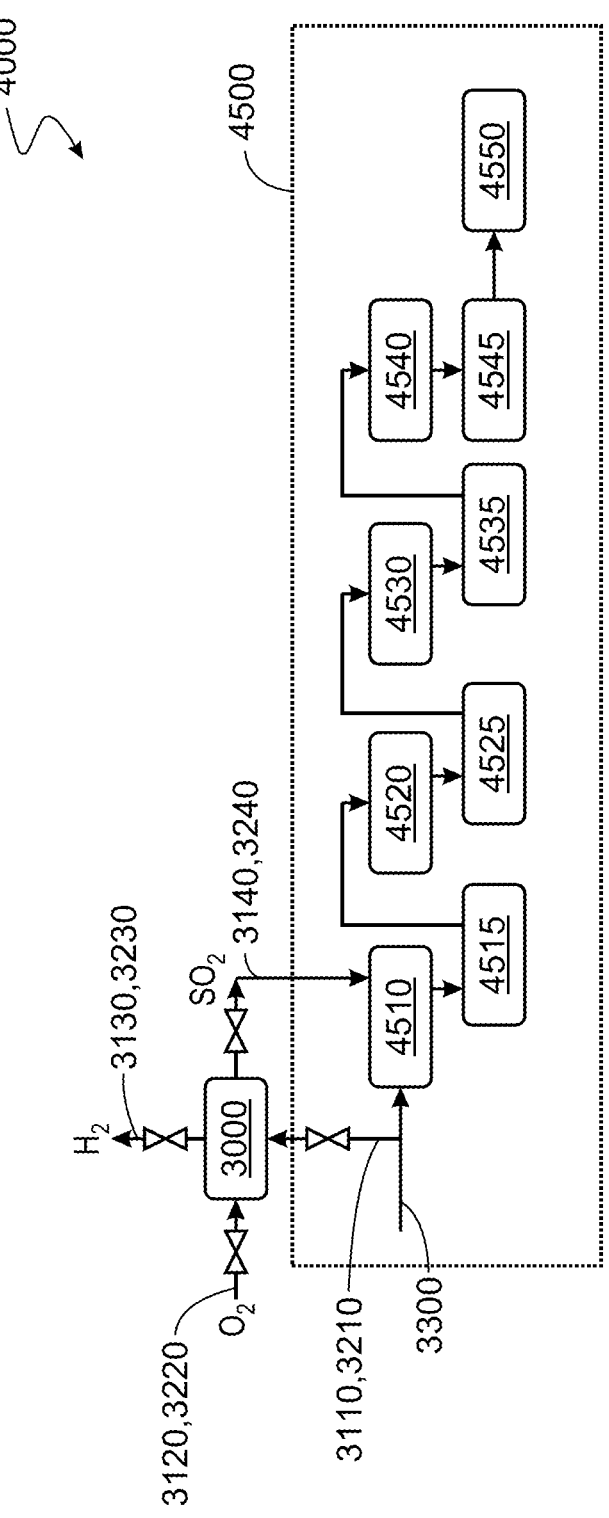
FIG. 4 schematically depicts a system.

FIG. 4 depicts a system 4000 including the system 3000 and a sulfur recovery unit (SRU) 4500. The SRU 4500 is used to convert $H_2S$ to elemental sulfur to reduce sulfur emissions (e.g., $SO_2$ and/or $H_2S$ emissions). The SRU 4500 has an acid gas stream 3300, a reaction furnace 4510, a condenser 4515, a catalytic converter 4520, a condenser 4525, a catalytic converter 4530, a condenser 4535, a catalytic converter 4540, a condenser 4545, and an incinerator 4550. The acid gas stream 3300 is in fluid communication with the reaction furnace 4510. In addition, $H_2$ is removed from the system 3000 via the outlet 3130 or the outlet 3230, and $SO_2$ flows from the system 3000 to the reaction furnace 4510 via the outlet 3140 or the outlet 3240.

In the reaction furnace 4510, a portion of the $H_2S$ from the acid gas stream 3300 is converted to $SO_2$. The resulting $SO_2$ is sent to the condenser 4515 where sulfur is condensed and removed. The resulting gas is sent to the catalytic converter 4520, where the Claus reaction is performed to convert $H_2S$ and $SO_2$ to water and $SO_2$ (see FIG. 6). The resulting gas is then sent to the condenser 4525, then the catalytic converter 4530, then the condenser 4535, then the catalytic converter 4540, and then the condenser 4545. Like the condenser 4515, the condenser 4525 and 4535 condense and remove sulfur from the gas. Like the catalytic converter 4520, the catalytic converters 4530 and 4540 are used to perform the Claus reaction. In some embodiments, the catalytic converter 4540 is replaced with a SuperClaus reactor or a EuroClaus reactor. The gas exiting the condenser 4545 is sent to an incinerator 4550, which converts the remaining sulfur compounds (e.g., $H_2S$) to $SO_2$. In this configuration, materials that could poison the catalyst in the catalytic converters 4520, 4530 and 4540 are burned in the reaction furnace 4510 before entering the catalytic converters 4520, 4530 and 4540.

In some embodiments, the gas exiting the condenser 4545 is sent to a tail gas treatment unit to separate $H_2S$ and $SO_2$ and recycle the gases back to the inlet of the SRU. In some embodiments, the separation includes membrane separation, absorption based separation and/or adsorption based separation.

Figure 5:
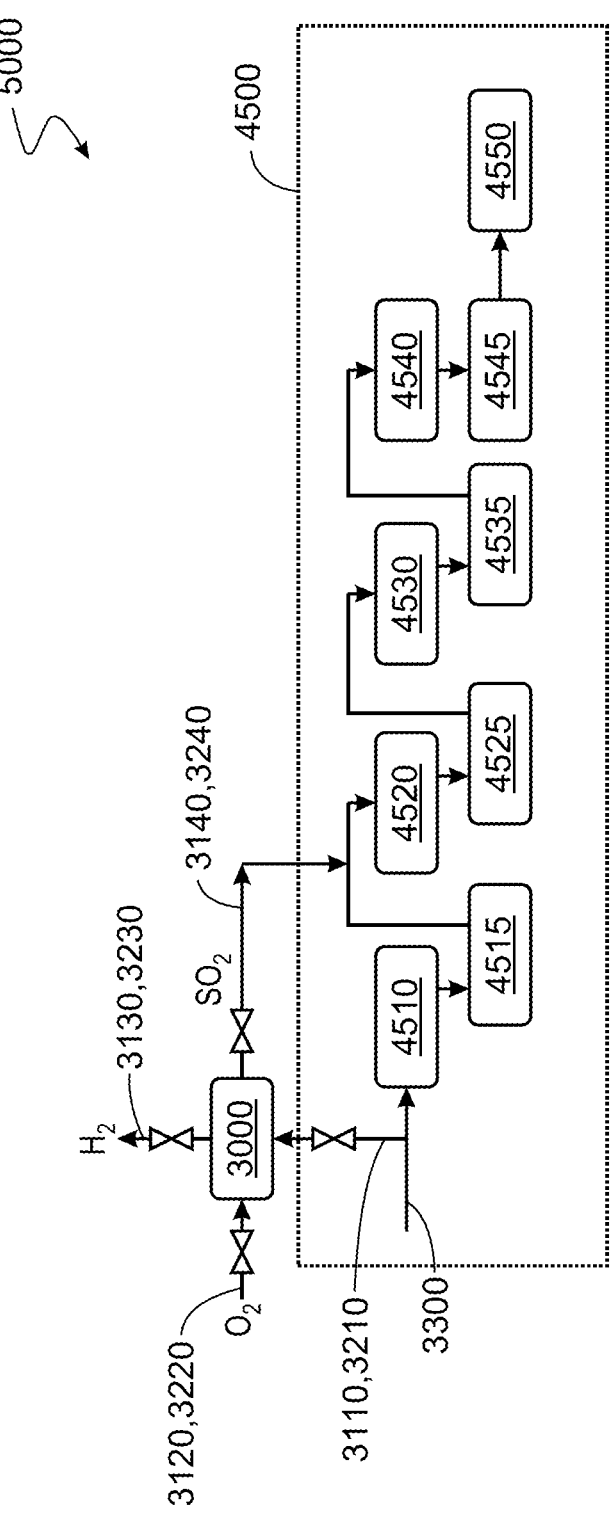
FIG. 5 schematically depicts a system.

FIG. 5 depicts a system 5000 containing the system 3000 and a sulfur recovery unit (SRU) 4500 with the components as described in the system 4000. However, unlike in the system 4000, in the system 5000, the $SO_2$ that leaves the system 3000 does not go to the reaction furnace 4510. Instead, in the system 5000, the $SO_2$ that leaves the system 3000, bypasses the reaction furnace 4510, and is sent to an inlet of the catalytic converter 4520. In this configuration the $SO_2$ can react with the $H_2S$ from the acid gas stream 3300 in the catalytic converter 4520. Additionally, the energy used for the system 5000 may be lower than the energy used for the system 4000, as $SO_2$ is not introduced into the reaction furnace 4510 where it may shift the reaction thermodynamics and not undergo conversion.

In general, the system 4000 or the system 5000 can operate with a relative flow rate of $H_2S$ and $SO_2$ as appropriate. For example, in some embodiments, the system 4000 or the system 5000 may have a 2:1 ratio of the molar flow rate of $H_2S$:$SO_2$ in the catalytic converter 4520 for the Claus reaction, shown in FIG. 6.

Optionally, a separator (e.g., an adsorption-based separator) can be placed downstream of the outlet 3140 of the reactor 3100 and the outlet 3240 of the reactor 3200 to reduce (e.g., prevent) the introduction of $O_2$ into the catalytic converter 4520, thereby reducing (e.g., preventing) poisoning of a catalyst surface in the catalytic converter 4520.

The system 3000, 4000 and/or 5000 can contain a separation unit (e.g., adsorption-based separator, absorption-based separator, membrane-based separator) to purify produced $H_2$ from the outlet 3130 of the reactor 3100 and the outlet 3230 of the reactor 3200. The $H_2S$ outlet of the separation unit to purify produced $H_2$ can be recycled back to the SRU 4500 either upstream of the reaction furnace 4510 or upstream of the catalytic converter 4520.

The system 3000 can contain a condenser to separate sulfur from the other gas components. Produced sulfur can be collected through a sulfur pit.

Example

Figure 7:
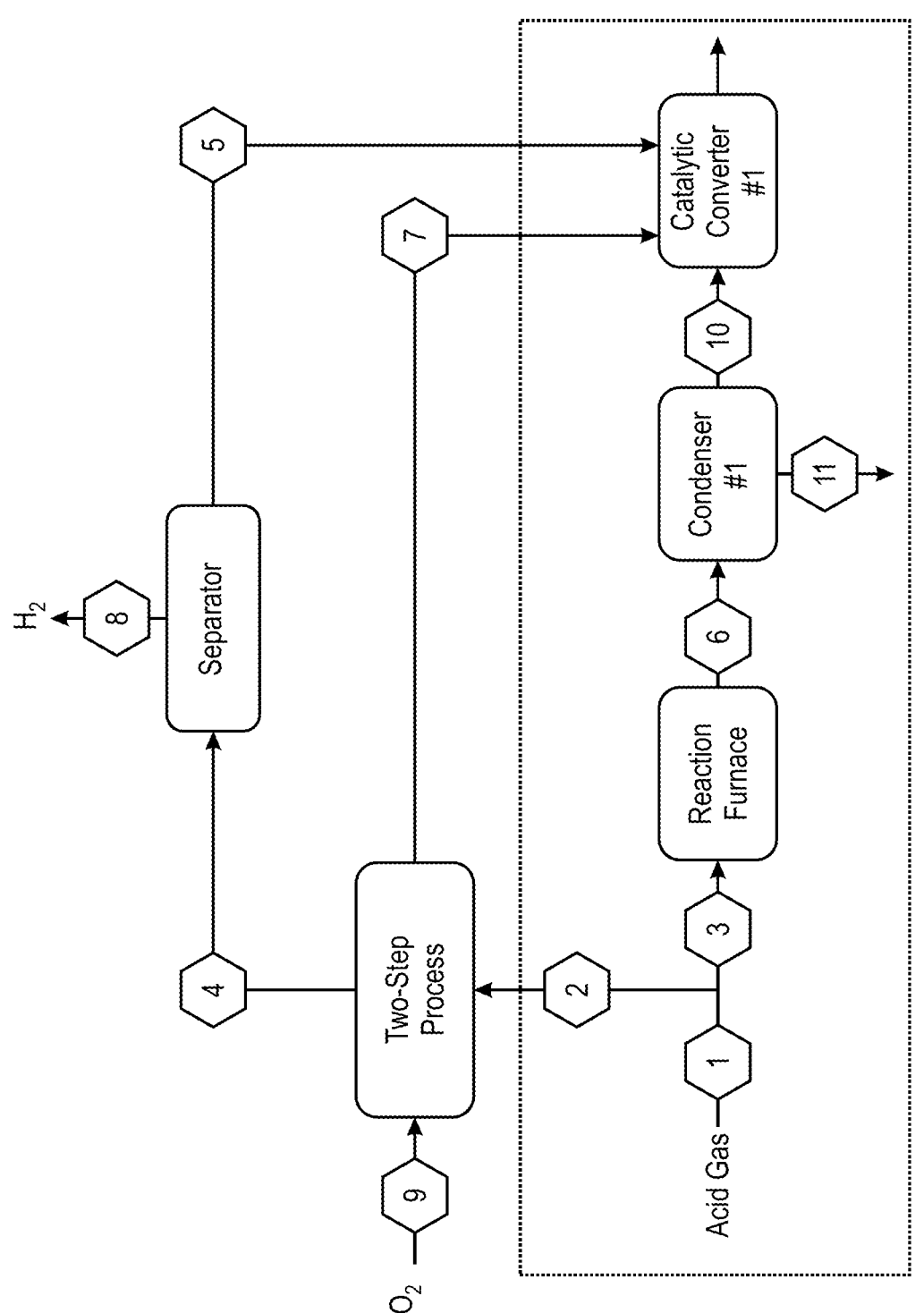
FIG. 7 depicts a simulation model.

FIG. 7 schematically depicts an example of a two-step process to produce $H_2$ from $H_2S$ as a complement to the Claus process where the flow rates based on the mass balance were calculated. For simplicity, only the reaction furnace, one condenser and one catalytic converter of the SRU are shown.

Table 1 shows the assumptions used to calculate the mass balance. Table 2 shows the flow rates for $H_2S$, $H_2$, $O_2$, $SO_2$ and $S_2$ that were calculated using the assumptions in Table 1 and performing a mass balance, as well as the total flow rate for the streams numbered in FIG. 7. In this example, $H_2S$ represented 50% of the total inlet gas flow rate (acid gas in stream 1), with the balance being $CO_2$. For simplicity, the flow rate of $CO_2$, which was considered mostly inert, is not shown. All flow rates shown in Table 2 are in kilomoles per hour (kmol/hr).

Stream 1, which mainly contained $H_2S$, was divided into two streams, with 71% of stream 1 going to the two-step process (stream 2) and the balance directed toward the reaction furnace (stream 3). The $H_2$ production was optimized by varying the division of stream 1 into streams 2 and 3. The relation between the division fraction and the amount of $H_2$ produced was obtained from the mass balance.

A mass balance was performed to calculate flow rates. As examples, the flow rates for $H_2S$ for stream 2 and $H_2$ for stream 4 were calculated using:

$$H_2S \text{ flow rate(stream 2)}=H_2S \text{ flow rate(stream 1)}\times\text{Division Fraction} \qquad \text{Equation 1}$$

$$H_2 \text{ flow rate(stream 4)}=H_2S \text{ flow rate(stream 2)}\times H_2S \text{ Conversion} \qquad \text{Equation 2}$$

In the two-step process, two reactors worked simultaneously (one undergoing regeneration and one undergoing $H_2S$ decomposition). Produced $SO_2$ from the regeneration step (stream 7) was directed to the catalytic converter #1 (assuming 100% oxidation of elemental sulfur using pure $O_2$ gas (stream 9) during the regeneration step). It was assumed that the two-step process converted $H_2S$ with 34% conversion. The outlet of the two-step process (stream 4) was directed toward a separator (100% separation efficiency between $H_2S$ and $H_2$ was assumed). The outlet of the separator (stream 5), which contained pure $H_2S$, was directed toward the catalytic converter #1. The other outlet of the separator (stream 8) contained pure $H_2$. It was assumed that 80% of $H_2S$ was converted in the reaction furnace, 10% of that was converted to $SO_2$ and the remaining to $S_2$ (stream 6). The condenser separated $S_2$ with 100% efficiency, resulting in pure $S_2$ (stream 11) and a mixture of $H_2S$ and $SO_2$ (stream 10).

Figure 8:
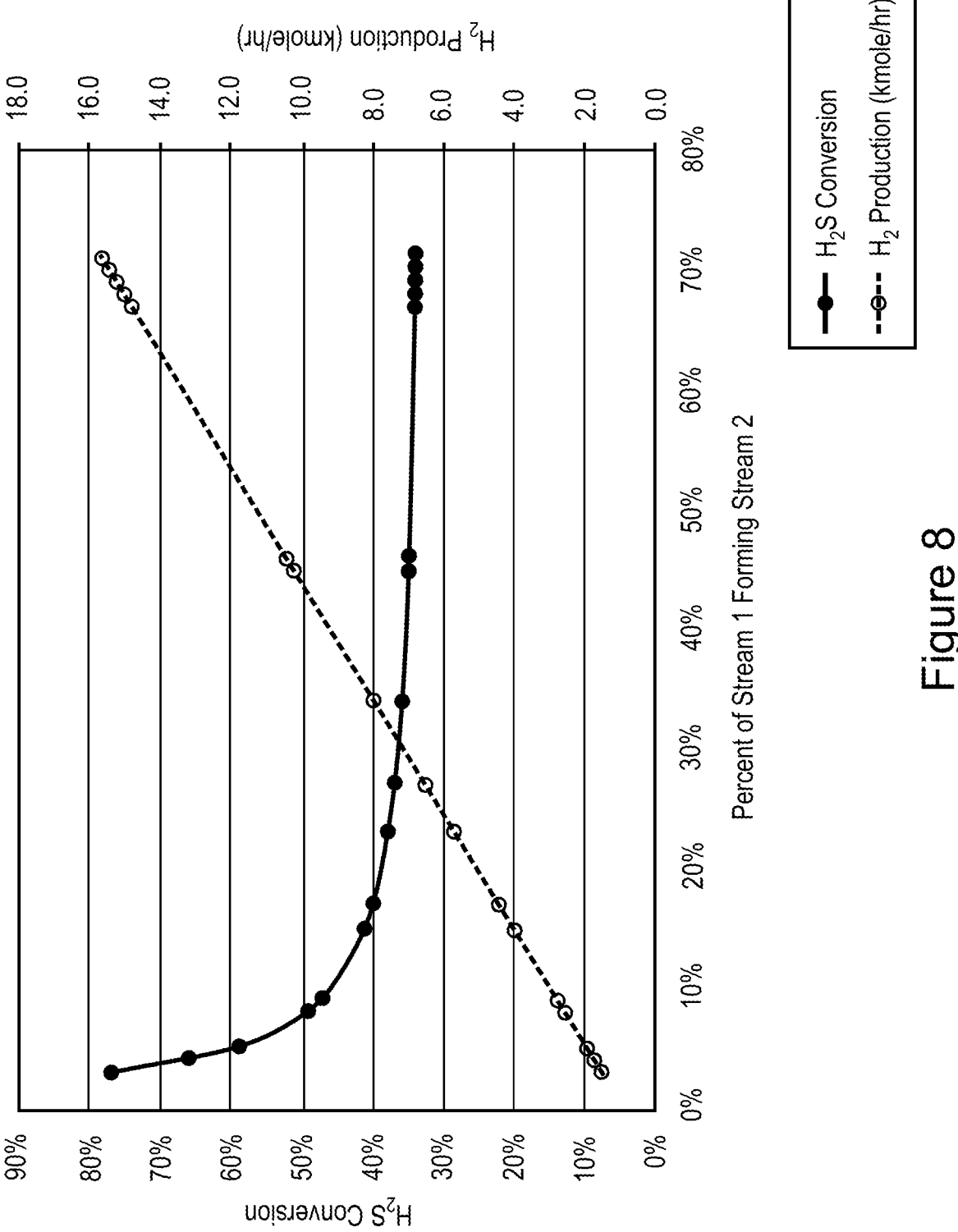
FIG. 8 depicts results of a simulation.

FIG. 8 shows $H_2$ production and $H_2S$ as the fraction of stream 1 being diverted to the two-step process (stream 2 increases).

TABLE 1

| Assumptions | |
|---|---|
| Conversion of $H_2S$ to $H_2$ | 0.34 |
| Conversion of S-catalyst to $SO_2$ | 1 |
| Separation between $H_2S$ and $H_2$ | 1 |
| $H_2S$ conversion in the reaction furnace | 0.8 |
| $H_2S/SO_2$ Ratio | 2.0 |
| $H_2S$ in reaction furnace is converted to $SO_2$ | 0.1 |
| Slip stream 2/3 | 0.71 |

TABLE 2

| | | | | | | Total Flow Rate |
|---|---|---|---|---|---|---|
| Stream | Components Flow Rate | | | | | |
| # | $H_2S$ | $SO_2$ | $S_2$ | $H_2$ | $O_2$ | kmol/hr |
| 1 | 65.0 | 0.0 | 0.0 | 0.0 | 0.0 | 65.0 |
| 2 | 46.2 | 0.0 | 0.0 | 0.0 | 0.0 | 46.2 |
| 3 | 18.9 | 0.0 | 0.0 | 0.0 | 0.0 | 18.9 |
| 4 | 30.5 | 0.0 | 0.0 | 15.7 | 0.0 | 46.2 |
| 5 | 30.5 | 0.0 | 0.0 | 0.0 | 0.0 | 30.5 |
| 6 | 3.8 | 1.5 | 13.6 | 0.0 | 0.0 | 18.9 |
| 7 | 0.0 | 15.7 | 0.0 | 0.0 | 0.0 | 15.7 |
| 8 | 0.0 | 0.0 | 0.0 | 15.7 | 0.0 | 15.7 |
| 9 | 0.0 | 0.0 | 0.0 | 0.0 | 15.7 | 15.7 |
| 10 | 3.8 | 1.5 | 0.0 | 0.0 | 0.0 | 5.3 |
| 11 | 0.0 | 0.0 | 13.6 | 0.0 | 0.0 | 13.6 |

Mass balance based on the process flow diagram in FIG. 7

Other Embodiments

While certain embodiments have been disclosed above, the disclosure is not limited to such embodiments.

As an example, while embodiments have been disclosed that include the SRU 3500 as depicted in the systems 4000 and 5000, the disclosure is not limited to such embodiments. For example, the SRU 4500 can contain one or more additional components not depicted. Additionally, or alternatively, the SRU 4500 may not contain each component depicted.

As another example, while systems have been described that include two reactors, the disclosure is not limited in this sense. For example, a system can include more than two (e.g., five or more, 10 or more, 25 or more, 50 or more) reactors.

What is claimed:

1. A system comprising:
a first reactor comprising:
   a first catalyst configured to catalyze the conversion of hydrogen sulfide to hydrogen gas and sulfur;
   a first gas inlet comprising a valve; and
   a second gas inlet comprising a valve;
a second reactor comprising:
   a second catalyst configured to catalyze the conversion of hydrogen sulfide to hydrogen gas and sulfur;
   a first gas inlet comprising a valve; and
   a second gas inlet comprising a valve;
a hydrogen sulfide source; and
an oxygen gas source;
wherein:
   in a first configuration of the system:
      the valve of the first gas inlet of the first reactor is open so that the hydrogen sulfide source is in fluid communication with an interior of the first reactor;

the valve of the second gas inlet of the first reactor is closed so that the oxygen gas source is in not fluid communication with an interior of the first reactor;
      the valve of the first gas inlet of the second reactor is closed so that the hydrogen sulfide source is not in fluid communication with an interior of the second reactor; and
      the valve of the second gas inlet of the second reactor is open so that the oxygen gas source is in fluid communication with an interior of the second reactor; and
   in a second configuration of the system:
      the valve of the first gas inlet of the first reactor is closed so that the hydrogen sulfide source is not in fluid communication with an interior of the first reactor;
      the valve of the second gas inlet of the first reactor is open so that the oxygen gas source is in fluid communication with an interior of the first reactor;
      the valve of the first gas inlet of the second reactor is open so that the hydrogen sulfide source is in fluid communication with an interior of the second reactor; and
      the valve of the second gas inlet of the second reactor is closed so that the oxygen gas source is not in fluid communication with an interior of the second reactor.

2. The system of claim 1, further comprising a controller configured to control the configuration of the system.

3. The system of claim 2, wherein the controller is configured to switch the system from the first configuration to the second configuration based on an amount of sulfur adsorbed to the first catalyst.

4. The system of claim 3, wherein the controller is configured to switch the system from the second configuration to the first configuration based on an amount of sulfur adsorbed to the second catalyst.

5. The system of claim 3, wherein the controller is configured to switch the system from the first configuration to the second configuration when at least 75% of the surface of the first catalyst contains adsorbed sulfur.

6. The system of claim 4, wherein the controller is configured to switch the system from the second configuration to the first configuration when at least 75% of the surface of the second catalyst contains adsorbed sulfur.

7. The system of claim 1, wherein:
the first reactor further comprises a gas outlet comprising a valve;
the second reactor further comprises a gas outlet comprising a valve;
the system further comprises a sulfur recovery unit (SRU);
in the first configuration:
   the valve of the gas outlet of the first reactor is closed so that the interior of the first reactor is not in fluid communication with the SRU; and
   the valve of the gas outlet of the second reactor is open so that the interior of the second reactor is in fluid communication with the SRU; and
in the second configuration:
   the valve of the gas outlet of the first reactor is open so that the interior of the first reactor is in fluid communication with the SRU; and
   the valve of the gas outlet of the second reactor is closed so that the interior of the second reactor is not in fluid communication with the SRU.

8. The system of claim 1, wherein the first catalyst and the second catalyst comprise a member selected from the group consisting of a metal sulfide, an alloy, a metal oxide, and a pure metal.

9. The system of claim 8, wherein the first catalyst and the second catalyst comprise a member selected from the group consisting of molybdenum sulfide, iron sulfide, a silver-bismuth alloy, vanadium oxide, iron oxide and molybdenum.

10. The system of claim 1, wherein the hydrogen sulfide source comprises a gas stream produced from treating a hydrocarbon stream produced from a hydrocarbon producing well.

11. The system of claim 1, wherein:

the first catalyst is further configured to convert adsorbed sulfur to sulfur dioxide when contacted with oxygen, thereby regenerating the first catalyst; and the second catalyst is further configured to convert adsorbed sulfur to sulfur dioxide when contacted with oxygen, thereby regenerating the second catalyst.

12. The system of claim 11, wherein:

the first reactor further comprises a gas outlet comprising a valve;

the second reactor further comprises a gas outlet comprising a valve;

the system further comprises a sulfur recovery unit (SRU);

in the first configuration:

the valve of the gas outlet of the first reactor is closed so that the interior of the first reactor is not in fluid communication with the SRU; and the valve of the gas outlet of the second reactor is open so that the interior of the second reactor is in fluid communication with the SRU; and in the second configuration:

the valve of the gas outlet of the first reactor is open so that the interior of the first reactor is in fluid communication with the SRU; and the valve of the gas outlet of the second reactor is closed so that the interior of the second reactor is not in fluid communication with the SRU.

13. The system of claim 12, wherein:

in the first configuration, sulfur dioxide present in the second reactor is directed to the SRU; and in the second configuration, sulfur dioxide present in the first reactor is directed to the SRU.

14. The system of claim 13, wherein:

the SRU comprises a reaction furnace;

in the first configuration the interior of the second reactor is in fluid communication with the reaction furnace of the SRU; and in the second configuration the interior of the first reactor is in fluid communication with the reaction furnace of the SRU.

15. The system of claim 14, wherein:

the SRU further comprises a catalytic converter; and the catalytic converter is configured to operate at a 2:1 molar flow rate of $H_2S:SO_2$.

16. The system of claim 13, wherein the SRU comprises a catalytic converter;

in the first configuration the interior of the second reactor is in fluid communication with the catalytic converter of the SRU; and in the second configuration the interior of the first reactor is in fluid communication with the catalytic converter of the SRU.

17. The system of claim 16, wherein the SRU further comprises a reaction furnace upstream of the catalytic converter.

18. The system of claim 16, wherein the catalytic converter is configured to operate at a 2:1 molar flow rate of $H_2S:SO_2$.

19. The system of claim 1, wherein the first catalyst and the second catalyst comprise a member selected from the group consisting of molybdenum sulfide, a silver-bismuth alloy, vanadium oxide, and molybdenum.

20. The system of claim 1, wherein the first catalyst and the second catalyst comprise a member selected from the group consisting of molybdenum sulfide and molybdenum.

*    *    *    *    *